United States Patent [19]

Yamada et al.

[11] 4,163,399
[45] Aug. 7, 1979

[54] POWER TRANSMISSION WITH PARALLEL CRANKSHAFT, INPUT SHAFT AND OUTPUT SHAFT

[75] Inventors: Youji Yamada, Kawagoe; Kunio Miyazaki, Oi; Masumi Hamane, Kawagoe, all of Japan

[73] Assignee: Honda Giken Kogyo Kabushiki Kaisha, Tokyo, Japan

[21] Appl. No.: 805,166

[22] Filed: Jun. 9, 1977

[30] Foreign Application Priority Data

Jun. 18, 1976 [JP] Japan ............................ 51-78964[U]

[51] Int. Cl.² ............................................ F16H 37/08
[52] U.S. Cl. ...................................... 74/700; 74/701; 74/705; 192/55; 192/67 P; 192/93 R
[58] Field of Search ......................... 74/700, 701, 705; 192/48.91, 106.1

[56] References Cited

U.S. PATENT DOCUMENTS

| 2,397,642 | 4/1946 | Blazek et al. ..................... 192/106.1 |
| 2,743,804 | 5/1956 | Roberts .............................. 192/48.91 |
| 3,017,787 | 1/1962 | Payne ..................................... 74/701 |
| 3,122,944 | 3/1964 | Boehner et al. ........................ 74/700 |
| 3,489,237 | 1/1970 | Van Winsen et al. ................. 74/700 |
| 3,780,840 | 12/1973 | Thomas .............................. 192/106.1 |

*Primary Examiner*—Benjamin W. Wyche
*Assistant Examiner*—James Yates
*Attorney, Agent, or Firm*—Haseltine, Lake & Waters

[57] ABSTRACT

A power transmission apparatus in which a crank shaft of an internal combustion engine, an input shaft of a speed-change mechanism and an output shaft of the speed-change mechanism are arranged in three parallel rows, the input shaft being provided at an end portion with a torque convertor drivingly coupled to the crank shaft. At least two gears are provided on the input shaft and are in mesh with respective gears rotatably mounted on the output shaft. The output shaft is provided at an intermediate portion between the two gears thereon with a shift member which is connected for common rotation with the output shaft but is slidable thereon in axial direction. Between each end surface of the shift member and a facing surface of the gear on the output shaft there is interposed a dog clutch comprising pins on one surface and pin openings in the other surface.

9 Claims, 9 Drawing Figures

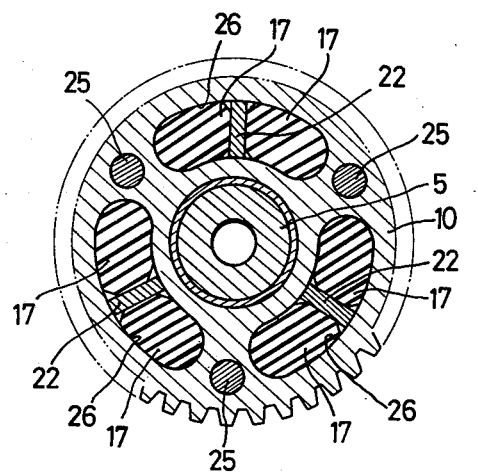
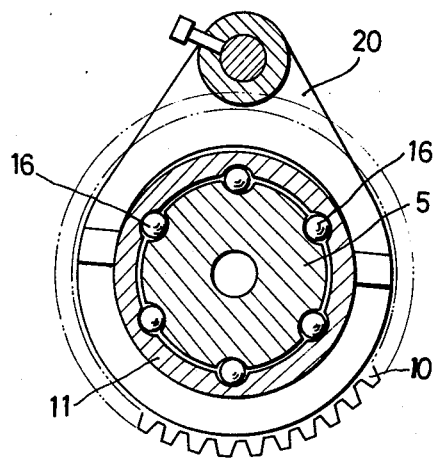

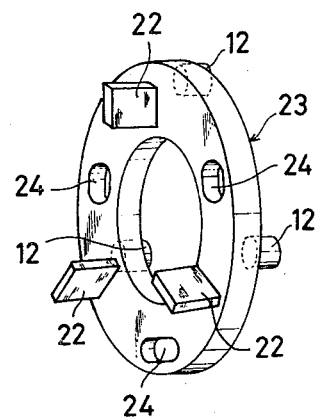
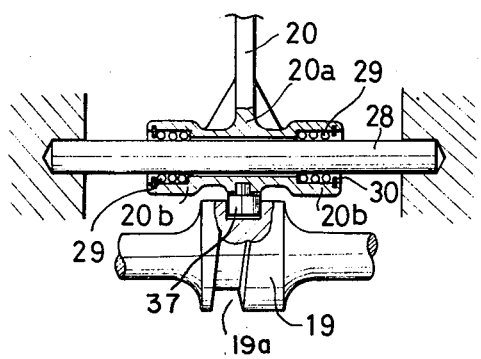

POWER TRANSMISSION WITH PARALLEL CRANKSHAFT, INPUT SHAFT AND OUTPUT SHAFT

BACKGROUND OF THE INVENTION

This invention relates to a power transmission apparatus chiefly adaptable to motorized two-wheeled vehicles, such as, a motorcycle or the like.

Generally, it is desirable with this kind of apparatus that the same is comparatively small in size, simple in construction and easy in operation.

SUMMARY OF THE INVENTION

An object of this invention is to provide an apparatus satisfying this requirement. According to this invention, a crank shaft of an internal combustion engine, an input shaft of a speed-change mechanism and an output shaft of the speed-change mechanism are arranged in three parallel rows, and the input shaft is coupled at an end portion with a torque convertor having at its input stage a driven gear in mesh with a driving gear mounted on the crank shaft, at least two gears in mesh with two gears on the input shaft are rotatably mounted on the output shaft, and the output shaft is provided, in an intermediate portion between the two gears, with a shift member which is in engagement therewith for common rotation but is slidable thereon in axial direction, and interposed between each end surface of the shift member and a facing surface of the associated gear on the output shaft is a dog clutch comprising pins on one side and pin openings in the other side.

BRIEF DESCRIPTION OF THE DRAWING

FIGS. 4 to 6 are sectional views taken respectively along lines IV—IV to VI—VI in FIG. 2.

FIG. 7 is a sectional view taken along line VII—VII in FIG. 3.

FIG. 8 is a perspective view of a part of a clutch member of the apparatus.

FIG. 9 is a top plan view, partly in section of a portion of another embodiment of the invention.

DETAILED DESCRIPTION

Figure 1:
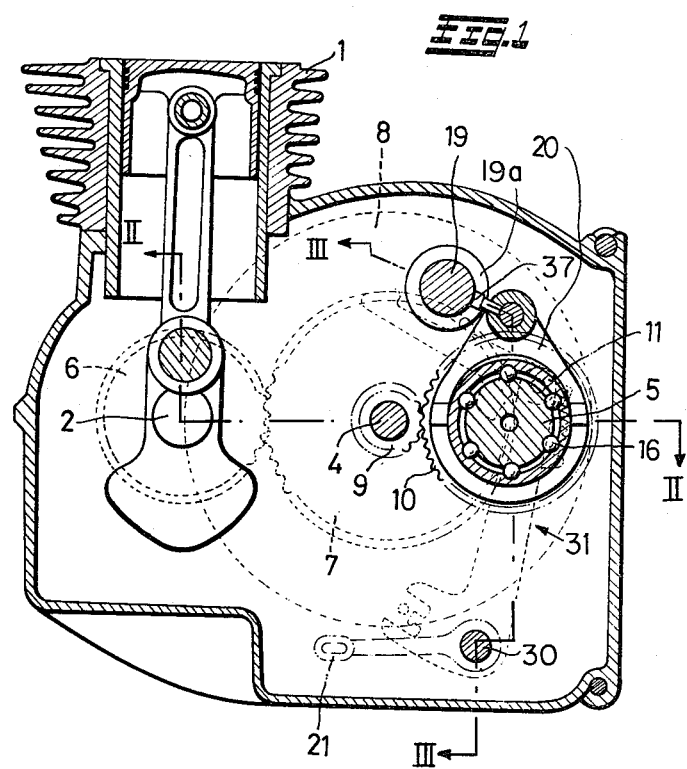
FIG. 1 is a sectional side elevational view of one embodiment according to this invention.
Figure 2:
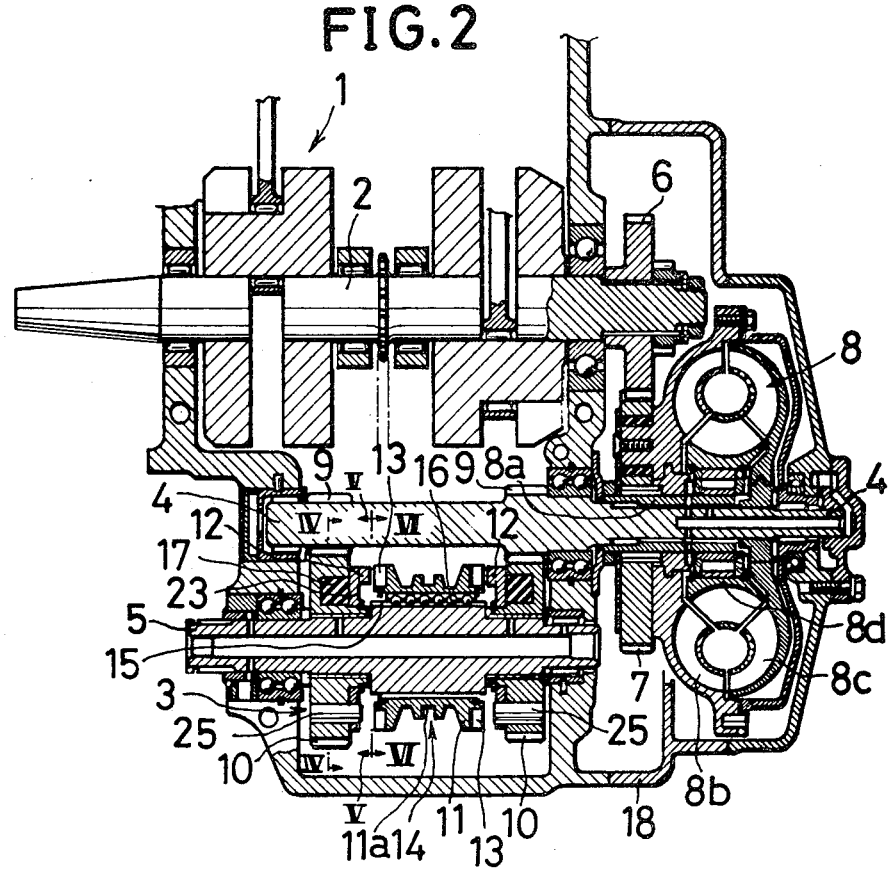
FIGS. 2 and 3 are sectional views taken respectively along lines II—II and III—III in FIG. 1.
Figure 3:
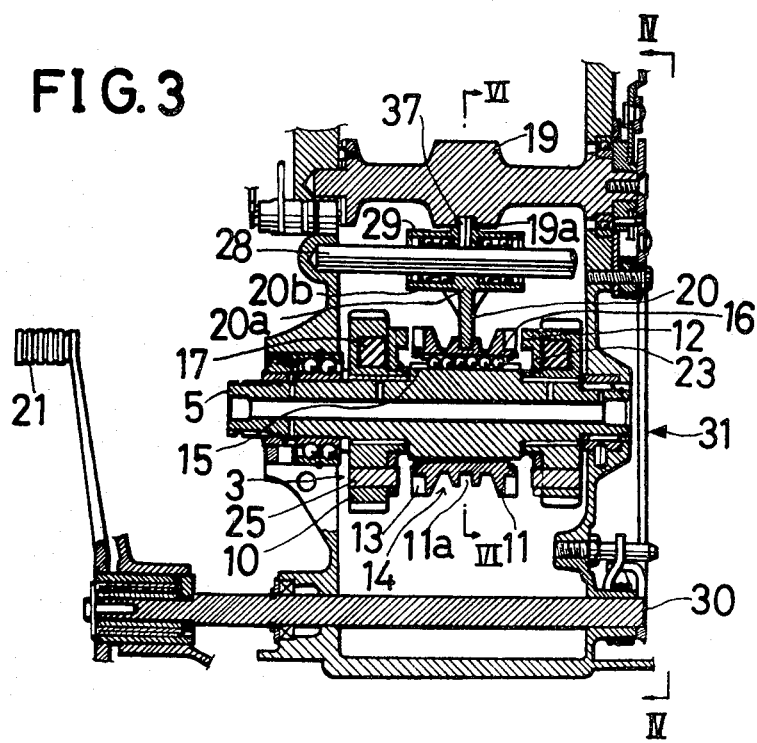
Figure 5:
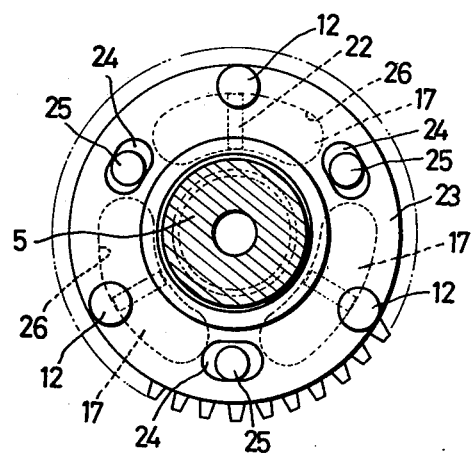
Figure 6:
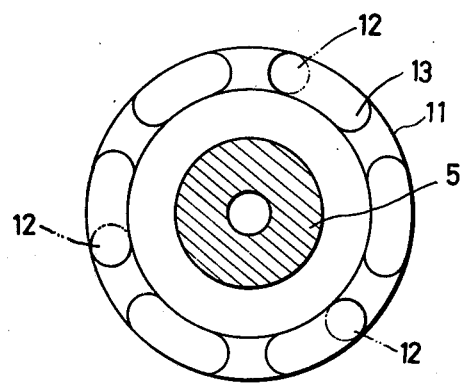

Referring to FIGS. 1–3, numeral 1 denotes an internal combustion engine having a crank shaft 2, numeral 3 denotes a speed-change mechanism having an input shaft 4 and an output shaft 5. The crank shaft 2, the input shaft 4 and the output shaft 5 are arranged in three rows parallel to one another. The input shaft 4 is provided at one end portion with a torque convertor 8 having at its input side a driven gear 7 in mesh with a driving gear 6 mounted on an end portion of crank shaft 2. At least two gears 9 are integrally secured on the input shaft 4 and two gears 10 in mesh therewith are rotatably mounted on the output shaft 5. The drive ratios of the pairs of gears 9 and 10 differ to provide different output speeds and power. The output shaft 5 is provided in an intermediate portion between the two gears 10 with a shift member 11 which is secured for common rotation with shaft 5 but is slidable thereon in the longitudinal direction to select the desired output speed and power. This slidable movement is achieved by the provision of a longitudinal array of ball bearings 16 disposed in circular recesses formed in part by longitudinal grooves in output shaft 5 and shift member 11. The circular recesses are arranged at circumferential intervals around the output shaft. Between each end surface of the shift member 11 and a facing surface of each gear 10 there is interposed a dog clutch 14 comprising pins 12 on gear 10 and pin openings 13 in the shift member. Numeral 18 denotes an outer surrounding frame housing containing all of the foregoing members.

The torque convertor 8 comprises a central stationary tubular shaft 8a, a pump member 8b around one side of shaft 8a, a turbine member 8c around shaft 8a on the other side thereof and a stator member 8d around shaft 8a between the pump member 8d and the turbine member 8c. The torque convertor is supported by the tubular shaft 8a on the outer end of the input shaft 4 and is connected at the input stage by pump member 8b to the driven gear 7 and also is in splined engagement in a central axial opening of the turbine member 8c with the shaft 4.

The shift member 11 is connected to a shift drum 19 through a shift fork 20 in a usual manner so that the member 11 may be given change-over movements to the right and the left by turning the drum 19 on operation of change pedal 21.

The dog clutches 14 each comprises, as shown clearly in FIGS. 2–8 the plurality of pins 12 on the surface of gear 10 facing a corresponding plurality of pin openings 13 in the shift member 11. More specifically, the clutch 14 comprises a base 23 having on its front surface the plurality of pins 12 and on its rear surface a plurality of leg members 22. The base 23 is abutted against the side surface of the gear 10 while respective openings 24 provided in the base 23 receive respective stopper pins 25 projecting from the gear 10 and concurrently each of the leg members 22 is inserted between a pair of left and right shock absorbing members 17 of rubber or the like mounted in a groove 26 provided in the gear 10. Thereby the clutch 14 is of shock-absorbing type and is capable of absorbing any shock in the turning direction. The pin openings 13 are circumferentially elongated in comparison with the pins 12 and the openings 24 are circumferentially elongated in comparison with the pins 25, the arrangement being such that the pins 25 are loosely received in openings 24 when pins 12 abut one end of openings 13 when the clutch is engaged in driving connection.

As shown clearly in FIGS. 1 and 3, the shift drum 19 is parallel to the output shaft 4, and a guide shaft 28 is also parallel thereto. The shift fork 20 is mounted on the guide shaft 28 so as to be axially slidable thereon in opposite directions.

As previously noted, the change-over movements to the right and left of member 11 is effected by operation of the change pedal 21. More particularly, change pedal 21 is secured to a shaft 30 which is rotatably supported by the housing of the transmission. Shaft 30 is connected by linkage 31 to shift drum 19 such that as change pedal 21 is displaced to cause shaft 30 to rotate, the drum 19 undergoes rotation therewith. The drum 19 has a helical groove 19a in which a pin 37 on shift fork 20 is engaged such that rotation of the drum 19 produces axial shifting of shift fork 20 on shaft 28. The shift fork 20 is engaged in a groove 11a in shift member 11 to displace the shift member in accordance with the displacement of the shift fork 20 on shaft 28.

The shift fork 20 has a supporting boss portion 20a on the guide shaft 28, and both ends of the supporting portion 20a extend in the longitudinal direction of the shaft 28 so as to form respective extended portions 20b. Between the portions 20b and the shaft 19 are interposed bearing balls 29. Thus, without the extended portion 20b, when the shift fork 20 is displaced by turning of the shift drum 19 by the operation of the change pedal 21, the supporting portion 20a is liable to be inclined by a force acting obliquely thereon and thereby resistance by friction or the like is produced so that the shift movement cannot be made smoothly. However, with the axially extended portions 20b on portion 20a, any force acting obliquely on the supporting portion 20a is transmitted to the extended portions 20b, and thereby a large inclination of the supporting portion 20a can be prevented, so that the frictional or biting resistance or the like is decreased and thus a smooth shift movement can be carried out.

FIG. 9 shows another embodiment of the shift fork section. In this embodiment, ball bearings 29 are disposed only at the outer end portions of the extended portions 20b. Numeral 30 denotes a stopper ring for the balls 29.

The operation of the apparatus is as follows.

When the crank shaft 2 of the engine 1 is rotated, its output is transmitted through the torque convertor 8 to the input shaft 4 and thereby the gears 10 are rotated through the respective gears 9. The input shaft 5 is in neutral position and remains at rest. If the shift member 11 is slidably moved from its neutral position in one direction or the other, the clutch 14 on the corresponding side is engaged for connecting member 11 to the corresponding gear 10 and thus the rotational drive is transmitted to the output shaft 5 through the member 11.

Any shock forces produced by the engagement of the clutch 14 is absorbed in the shock absorbing member 17 and thus the taking-out of the power can be achieved smoothly. Furthermore, since the shift member 11 is in engagement with the output shaft 5 through the large number of balls 16, the shifting movement of member 11 is smooth and light. Additionally, since the extended portions 20b on the supporting portion 20a is supported on guide shaft 18 through the balls 19 its shift movement, and thereby the shift operation of the shift member 11 is effected smoothly.

Thus, according to this invention, the apparatus is simple in operation because the output can be taken out freely by a change-over movement of the shift member, and further the apparatus is made comparatively small in size because the crank shaft, the input shaft and the output shaft are disposed in three parallel rows while the torque convertor is provided on the end portion of the input shaft. Additionally, since each of the clutches 14 is constructed as a dog clutch, the apparatus is simple in construction in comparison with a conventional arrangement wherein frictional clutches are used. Furthermore, the output shaft is accompanied in its rotation by the shift member alone, so that its inertia mass becomes small and changeable output power is decreased.

Additionally, the shift member and the shift fork operate smoothly in shifting operation.

Numerous modifications and variations of the disclosed embodiments will now become apparent to those skilled in the art without departing from the scope and spirit of the invention.

What is claimed is:

1. Power transmission apparatus comprising an internal combustion engine having a crank shaft, a speed-change mechanism having an input shaft and an output shaft, said crank shaft, said input shaft and said output shaft being mounted in three parallel rows, a torque converter disposed at an end portion of said input shaft and drivingly coupled thereto, two axially spaced gears rotatably mounted on said output shaft and driven in rotation from said input shaft, a shift member mounted on said output shaft between said two gears, a shift drum and a guide shaft extending parallel to said output shaft, a shift fork axially movable on said guide shaft and in engagement with said shift member and said shift drum to effect relative axial displacement of said shift member on said output shaft towards said gears and dog clutch means between said shift member and each of said two gears for engaging the same in rotation upon relative axial displacement of said shift member.

2. Power transmission apparatus as claimed in claim 1 wherein said shift member has surfaces facing opposed surfaces on said gears, said dog clutch means comprising pins on one of said surfaces engageable in openings provided in the other of the surfaces.

3. Power transmission apparatus as claimed in claim 2 wherein said openings are circumferentially elongated in comparison with said pins.

4. Power transmission apparatus as claimed in claim 2 wherein said dog clutch means comprises shock absorbing means.

5. Power transmission apparatus as claimed in claim 4 wherein said dog clutch means comprises a base abutting against said one of said surfaces, said pins being on said base, said shock absorber means connecting said base with said member having said one of said surfaces.

6. Power transmission apparatus as claimed in claim 5 wherein said base includes leg members projecting towards said member with said one of said surfaces, the latter said member having openings loosely receiving said leg members, said shock absorber means comprising resilient members disposed in said openings and resiliently engaging said leg members.

7. Power transmission apparatus as claimed in claim 1 wherein said shift member and said output shaft include a longitudinal array of ball-bearing means for facilitating relative axial movement therebetween.

8. Power transmission apparatus as claimed in claim 7 wherein said shift member and said output shaft have longitudinal grooves therein cooperatively defining circular recesses at circumferential intervals, said ball bearing means comprising a plurality of balls disposed in longitudinal array in said recesses.

9. Power transmission apparatus as claimed in claim 1 wherein said shift fork includes a central boss, axially extending portions on said boss surrounding said guide shaft, and ball bearings interposed between said guide shaft and said axially extended portions.

* * * * *